United States Patent
Xu et al.

(10) Patent No.: US 10,700,884 B2
(45) Date of Patent: Jun. 30, 2020

(54) METHOD, APPARATUS AND COMPUTER PROGRAM PRODUCT FOR DATA DISTRIBUTION

(71) Applicant: Nokia Technologies Oy, Espoo (FI)

(72) Inventors: Xiang Xu, Nanjing (CN); David Navratil, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/090,094

(22) PCT Filed: Apr. 1, 2016

(86) PCT No.: PCT/CN2016/078342
§ 371 (c)(1),
(2) Date: Sep. 28, 2018

(87) PCT Pub. No.: WO2017/166298
PCT Pub. Date: Oct. 5, 2017

(65) Prior Publication Data
US 2019/0123926 A1    Apr. 25, 2019

(51) Int. Cl.
*H04L 12/18*     (2006.01)
*H04L 12/58*     (2006.01)
(Continued)

(52) U.S. Cl.
CPC .......... *H04L 12/1845* (2013.01); *H04L 29/08* (2013.01); *H04L 45/16* (2013.01);
(Continued)

(58) Field of Classification Search
CPC .................................................. H04L 12/1845
(Continued)

(56) References Cited

U.S. PATENT DOCUMENTS

2004/0255033 A1    12/2004  Edney et al.
2006/0223492 A1*   10/2006  Chin ................ H04L 12/1895
                                                                 455/404.1
(Continued)

FOREIGN PATENT DOCUMENTS

CN         104754681 A      7/2015
WO    WO-2009097870 A1 *    8/2009    ............. H04L 67/18

OTHER PUBLICATIONS

3GPP, "Study of LTE support for V2X services," 3GPP TSG-SA WG1 Meeting #69 (S1-150284), Sanya, P.R. China, Feb. 2-6, 2015, (6 pages).

(Continued)

*Primary Examiner* — Peter G Solinsky
(74) *Attorney, Agent, or Firm* — Mintz Levin Cohn Ferris Glovsky and Popeo, P.C.

(57) ABSTRACT

Methods, apparatuses and computer program products are disclosed for data distribution. A method comprises: sending a message, containing an indication of a target area related to first data to be distributed, from a first distribution unit to a distribution management device; receiving first information comprising at least one target address from the distribution management device in response to sending of the message, wherein the at least one target address is related to one or more second distribution units covering the target area; and sending the first data to the at least one target address when the message does not contain the first data.

19 Claims, 10 Drawing Sheets

(51) Int. Cl.
*H04L 29/08* (2006.01)
*H04W 4/06* (2009.01)
*H04L 12/761* (2013.01)
*H04L 12/741* (2013.01)

(52) U.S. Cl.
CPC .............. *H04L 45/74* (2013.01); *H04L 51/20* (2013.01); *H04W 4/06* (2013.01)

(58) Field of Classification Search
USPC ......................................................... 370/390
See application file for complete search history.

(56) References Cited

U.S. PATENT DOCUMENTS

| | | | | |
|---|---|---|---|---|
| 2011/0004672 | A1* | 1/2011 | Garcia-Martin | H04L 67/18 709/220 |
| 2015/0288733 | A1* | 10/2015 | Mao | H04L 65/4076 709/219 |
| 2017/0142766 | A1* | 5/2017 | Kim | H04W 48/20 |
| 2018/0192268 | A1* | 7/2018 | Xu | G08G 1/00 |
| 2019/0028862 | A1* | 1/2019 | Futaki | G08G 1/09 |
| 2019/0058981 | A1* | 2/2019 | Xu | H04W 4/06 |
| 2019/0090099 | A1* | 3/2019 | Wang | H04L 45/38 |
| 2019/0104386 | A1* | 4/2019 | Kim | H04W 76/00 |

OTHER PUBLICATIONS

3GPP, "Technical Specification Group Services and System Aspects; Multimedia Broadcast/Multicast Sevice (MBMS); Architecture and functional description (Release 13)," 3rd Generation Partnership Project, 3GPP TS 23.246 V13.3.0, Section 5.1.6, Dec. 2015, (68 pages).

European Patent Office, European Search Report for EP 16896077. 1, dated Sep. 3, 2019, 7 pages.

LG Electronics, Inc., WID proposal for normative work on LTE-based V2X, 36PP TSG-SA WGI Meeting No. 71, 2015, 5 pages.

LTE support for V2X services, 3GPP work item description, 2015, 5 pages.

Universal Mobile Telecommunications System (UMTS), ETS ITS 123 246 Technical Specification, 2016, Version 13.3.0, Release 13.

* cited by examiner

200

202 Sending a message, containing an indication of a target area related to first data to be distributed, from a first distribution unit to a distribution management device

204 Receiving first information comprising at least one target address from the distribution management device in response to sending of the message, wherein the at least one target address is related to one or more second distribution units covering the target area

206 Sending the first data to the at least one target address when the message not containing the first data

302 Receiving a message, containing an indication of a target area related to first data to be distributed from a first distribution unit

304 Determining one or more second distribution units covering the target area

306 Sending first information comprising at least one target address from a distribution management device to the first distribution unit, wherein the at least one target address is related to the one or more second distribution units covering the target area

Fig.3

METHOD, APPARATUS AND COMPUTER PROGRAM PRODUCT FOR DATA DISTRIBUTION

CROSS REFERENCE TO RELATED APPLICATIONS

This application is a national-phase entry of Patent Cooperation Treaty Application No. PCT/CN2016/078342 filed Apr. 1, 2016, entitled "METHOD, APPARATUS AND COMPUTER PROGRAM PRODUCT FOR DATA DISTRIBUTION," the contents of which are hereby incorporated by reference in their entirety.

FIELD OF THE INVENTION

Embodiments of the disclosure generally relate to communication, and, more particularly, to data distribution in a network.

BACKGROUND

The fast development of networks and electronic devices has dramatically changed the way of data communication such as data collection and distribution. There are increasing applications/systems required to share information/data among devices, apparatuses, units, sensors, people, infrastructures, networks, systems, applications and/or vehicles and the like. For example, intelligent transport systems (ITS) are systems to support transportation of goods and humans with information and communication technologies in order to efficiently and safely use the transport infrastructure and transport means (cars, trains, planes, ships). ITS applications may be distributed among multiple ITS-stations (ITS-S) in order to share information using communication technology such as wireless and/or wired communications. ITS applications may provide a large diversity of services. The data may be collected by utilizing ubiquitous sensor-embedded smart devices or other suitable means, and transmitted to one or more receivers for example in a target area such as a geographical area through a communication network, such as a cellular network or internet. The data may be shared in a way of point to point, point to multipoint, point to a target area, or the like. Therefore, it is required an effective and cost efficient solution for data distribution.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided a method for data distribution in a network. The method may comprises: sending a message, containing an indication of a target area related to first data to be distributed, from a first distribution unit to a distribution management device; receiving first information comprising at least one target address from the distribution management device in response to sending of the message, wherein the at least one target address is related to one or more second distribution units covering the target area; and sending the first data to the at least one target address when the message does not contain the first data.

According to another aspect of the disclosure, it is provided an apparatus comprising: a transmitter configured to send a message, containing an indication of a target area related to first data to be distributed, from a first distribution unit to a distribution management device; a receiver configured to receive first information comprising at least one target address from the distribution management device in response to sending of the message, wherein the at least one target address is related to one or more second distribution units covering the target area; and the transmitter further configured to send the first data to the at least one target address when the message does not contain the first data.

According to still another aspect of the disclosure, it is provided an apparatus. The apparatus comprises: at least one processor; and at least one memory including computer program code, wherein the at least one memory and the computer program code are configured to, with the at least one processor, cause the apparatus to: send a message, containing an indication of a target area related to first data to be distributed, from a first distribution unit to a distribution management device; receive first information comprising at least one target address from the distribution management device in response to sending of the message, wherein the at least one target address is related to one or more second distribution units covering the target area; and send the first data to the at least one target address when the message does not contain the first data.

According to still another aspect of the present disclosure, it is provided a computer program product comprising at least one non-transitory computer-readable storage medium having computer-executable program instructions stored therein, the computer-executable instructions being configured to, when being executed, cause an apparatus to operate as described above.

According to still another aspect of the present disclosure, it is provided a non-transitory computer readable medium having encoded thereon statements and instructions to cause an apparatus to operate as described above.

According to one aspect of the disclosure, it is provided a method for data distribution in a network. The method may comprise: receiving a message, containing an indication of a target area related to first data to be distributed from a first distribution unit; determining one or more second distribution units covering the target area; and sending first information comprising at least one target address from a distribution management device to the first distribution unit, wherein the at least one target address is related to the one or more second distribution units covering the target area.

According to another aspect of the disclosure, it is provided an apparatus comprising: a receiver configured to receive a message, containing an indication of a target area related to first data to be distributed from a first distribution unit; a determining element configured to determine one or more second distribution units covering the target area; and a transmitter configured to send first information comprising at least one target address from a distribution management device to the first distribution unit, wherein the at least one target address is related to the one or more second distribution units covering the target area.

According to still another aspect of the disclosure, it is provided an apparatus. The apparatus comprises: at least one processor; and at least one memory including computer program code, wherein the at least one memory and the computer program code are configured to, with the at least one processor, cause the apparatus to: receive a message, containing an indication of a target area related to first data to be distributed from a first distribution unit; determine one or more second distribution units covering the target area; and send first information comprising at least one target address from a distribution management device to the first distribution unit, wherein the at least one target address is related to the one or more second distribution units covering the target area.

According to still another aspect of the present disclosure, it is provided a computer program product comprising at least one non-transitory computer-readable storage medium having computer-executable program instructions stored therein, the computer-executable instructions being configured to, when being executed, cause an apparatus to operate as described above.

According to still another aspect of the present disclosure, it is provided a non-transitory computer readable medium having encoded thereon statements and instructions to cause an apparatus to operate as described above.

These and other objects, features and advantages of the disclosure will become apparent from the following detailed description of illustrative embodiments, which are to be read in connection with the accompanying drawings.

BRIEF DESCRIPTION OF THE DRAWINGS

FIG. 2 is a diagram depicting a process of data distribution method in a data distribution system according to an embodiment;

FIG. 3 is a diagram depicting a process of data distribution method in a data distribution system according to another embodiment;

DETAILED DESCRIPTION

Figure 1A:
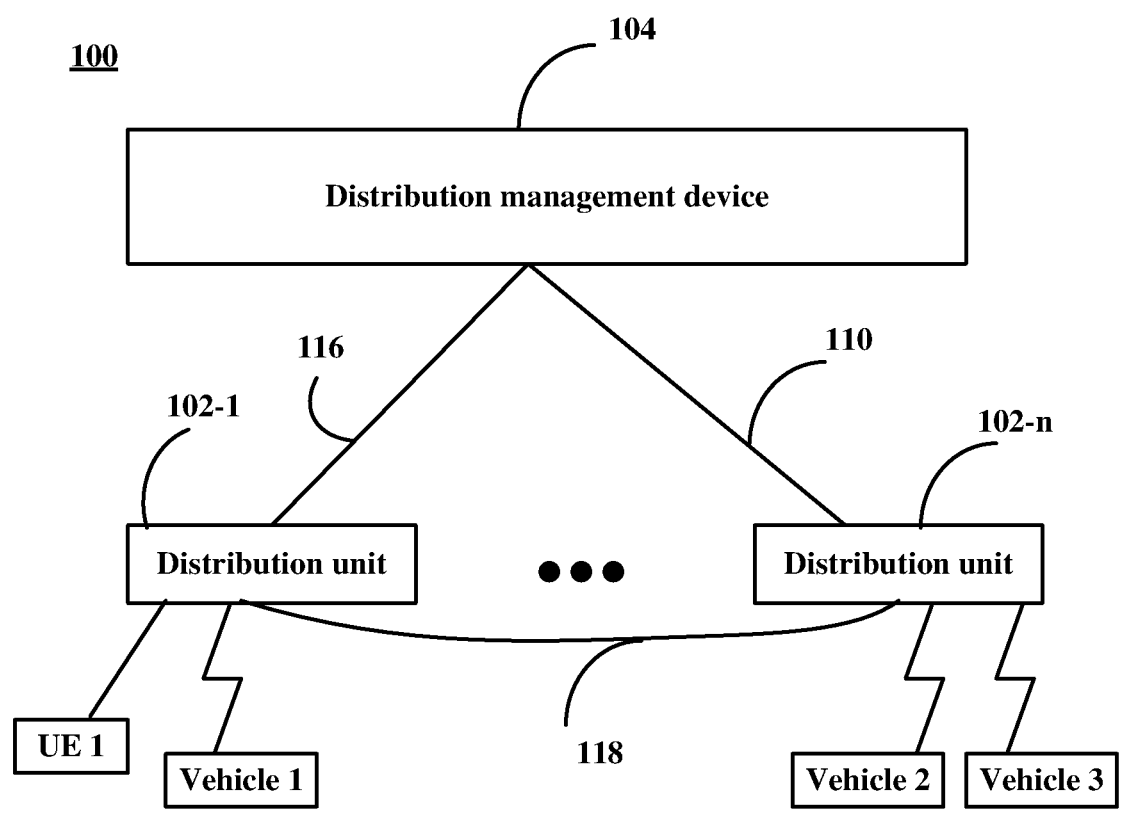
FIG. 1A is a simplified block diagram illustrating a data distribution system according to an embodiment.

For the purpose of explanation, details are set forth in the following description in order to provide a thorough understanding of the embodiments disclosed. It is apparent, however, to those skilled in the art that the embodiments may be implemented without these specific details or with an equivalent arrangement.

V2X services are examples for data distribution services. 3GPP TSG-SA WG1 Meeting #69 agreed a Rel-14 study on LTE support for V2X services to investigate the essential use cases and requirements for the following (refer to S1-150284/SP-150051, which are incorporated herein by reference):

V2V (vehicle-to-vehicle): covering LTE-based communication between vehicles.

V2P (vehicle-to-pedestrian): covering LTE-based communication between a vehicle and a device carried by an individual (e.g. handheld terminal carried by a pedestrian, cyclist, driver or passenger).

V2I/N (vehicle-to-infrastructure/network): covering LTE-based communication between a vehicle and a roadside unit/network. A roadside unit (RSU) is a transportation infrastructure entity (e.g. an entity transmitting speed notifications) implemented in an eNodeB or a stationary UE.

RSU is an entity supporting V2X service that can transmit to, and receive from a UE using V2X application. RSU may be implemented in an eNodeB or a stationary UE. Multimedia Broadcast Multicast Service (MBMS) is considered as a valid delivery method for downlink. The RSU-RSU interface is needed to forward the V2X data. The V2V packet may be location dependent. The V2V packet may be usually distributed in a target area.

Section 5.1.6 of 3GPP TS 23.246 version 13.3.0 Release 13 describes Location Dependent Content Transfer for the same MBMS User Service (Broadcast Mode only) as follows, which is incorporated herein by reference, "Some MBMS user services may broadcast different content in different areas of the network. In such case the UE (user equipment) is not aware of the relation between location and content, i.e. the UE just activates the reception of the service and receives the content that is relevant for its location. The BM-SC (Broadcast Multicast Service Center) controls which content is broadcasted in which area by establishing a separate MBMS bearer service for each content data flow. All MBMS bearer services of the same MBMS user service share the same TMGI (Temporary Mobile Group Identity) but bear different Flow Identifiers. The BM-SC allocates the Flow Identifier during the MBMS Session Start procedure and initiates a separate session for each content data flow. For IP Multicast support in EPS (Evolved Packet System), the MBMS GW (gateway) allocates an IP Multicast Address based on the TMGI and Flow Identifier (broadcast mode only). Since in any specific location only one version of the content shall be available at any point in time, the MBMS Service Areas of each session of a same user service shall not overlap; this shall be ensured by proper configuration of the service in the BM-SC. The RNC (Radio Network Controller) and the eNodeB (Evolved Node B) ultimately enforces this constraint by rejecting any session start request with the same TMGI as an already active session if there is any overlap in the respective service areas. As indicated above, the UE is unaware of the Flow Identifier and of the existence of multiple sessions for the same MBMS user service."

However, using location dependent MBMS for V2X has some issues:

Signalling load issue: location dependent MBMS may require the BM-SC to initiate the MBMS Session Start procedure for every area. In an extreme case, each eNB may send different V2X packets. This may require BM-SC to initiate MBMS Session Start procedure for each eNB. A PLMN (public land mobile network) can support up to $2^{20}$ eNBs. In the extreme case, BM-SC has to initiate $2^{20}$ MBMS Session Start procedures. This may be impractical.

IP multicast group load issue: Location Dependent MBMS may require MBMS-GW to allocate an IP multicast address for each area. In the above extreme case, the MBMS-GW may need to allocate/manage up to $2^{20}$ IP multicast groups.

Latency issue: the application data such as V2X packet may be first sent to BM-SC. This may cause long transmission delay (e.g. 30-40 ms latency for RSU->BM-SC->RSU).

It is noted that the above mentioned issues are only exemplary issues in the V2X system and there may other issues to be optimized in other suitable data distribution services. Therefore it requires an effective and cost efficient solution for data distribution in a network/system such as a V2X system.

FIG. 1A shows a simplified block diagram illustrating a data distribution system according to an embodiment. As shown in FIG. 1A, the data distribution system 100 may comprise a distribution management device 104. The distribution management device 104 may be configured to perform distribution unit management function, such as configuration, information maintenance of distribution units, address allocation, multicast address allocation, broadcast/multicast management, mobility management, authentication, authorization and accounting, encryption/decryption, or other suitable functions. The distribution management device 104 may further be configured to perform distribution control function, such as registration of distribution units, mapping between a target area and one or more distribution units, data distribution, distribution approach management or other suitable functions. In some embodiments where there are multiple data distribution tasks going on, the distribution management device 104 can also be used for those tasks. The distribution management device 104 can be implemented in form of hardware, software or their combination, including but not limited to, telecommunication device/system, communication device/system, cloud computer, distributed computing system, virtual computer, smart phones, tablets, laptops, servers, thin clients, set-top boxes and PCs. The distribution management device 104 may run with any kind of operating system including, but not limited to, Windows, Linux, UNIX, Android, iOS and their variants. As an example, the distribution management device 104 which may incorporate the functionality described herein may be collocated with or integrated into a telecommunication device/system such as BM-SC, MBMS-GW, MME (Mobile Management Entity)/MCE (Multi-cell/multicast Coordination Entity) and the like.

The data distribution system 100 may comprise a plurality of distribution units 102-1, 102-n each operably connected to the distribution management device 104 through respective connections 116, 110. The distribution units 102-1, 102-n may communicate with each other through a connection 118. A distribution unit may be a source or destination of data. In a data distribution task, if the distribution unit 102-1 is a source of data, then it may receive the data from its served devices or users or collect the data by itself; if the distribution unit 102-n is a destination of the data, then the distribution unit 102-n may use the data and/or further distribute the data to its served devices or users. The distribution unit 102-1 can send and/or receive data to/from the distribution management device 104, distribution unit 102-n or other distribution units according to a protocol, such as Wireless Application Protocol (WAP), Hyper Text Transfer Protocol (HTTP), Hyper Text Transfer Protocol over Secure Socket Layer (HTTPS), Transmission Control Protocol/Internet Protocol (TCP/IP) and/or User Datagram Protocol (UDP), standard communication protocol and/or the like. The distribution units 102-1, 102-n can be implemented in form of hardware, software or their combination, including but not limited to, telecommunication device/system, communication device/system, eNodeB, RNC/BSC (radio network controller/base station controller), wireless communication device, fixed terminal, mobile terminal, portable terminal, smart phone, desktop computer, cloud client, laptop computer, intelligent glasses, vehicle-embedded terminals with various sensors, smart watch, hand set, station, unit, device, multimedia tablet, Internet/network node, communicator, Personal Digital Assistant (PDA), wearable device, client software, or any combination thereof. The distribution units 102-1, 102-n may run with any kind of operating system including, but not limited to, Windows, Linux, UNIX, Android, iOS and their variants. In an embodiment, the distribution units 102-1, 102-n may be eNodeB type RSUs.

The distribution unit such as distribution unit 102-1 may cover one or more serving areas such as a geological area or other suitable area, and provide services to one or more communication devices or users within their serving areas, such as user equipments (UEs), vehicles, sensors, cellphones, mobile terminals, fixed terminals, or other suitable apparatuses. As shown in FIG. 1A, the connection between the distribution units 102-1, 102-n may be wireless or wired connection. For example, if the distribution unit 102-1 is an eNodeB type RSU and the data received from the distribution unit 102-n (for example, the data may be sent to the distribution unit 102-n by vehicle 2) may be distributed to all users/devices within the coverage area of the distribution unit 102-1, then the distribution unit 102-1 can distribute the data through a broadcast approach such as MBMS.

Figure 1B:
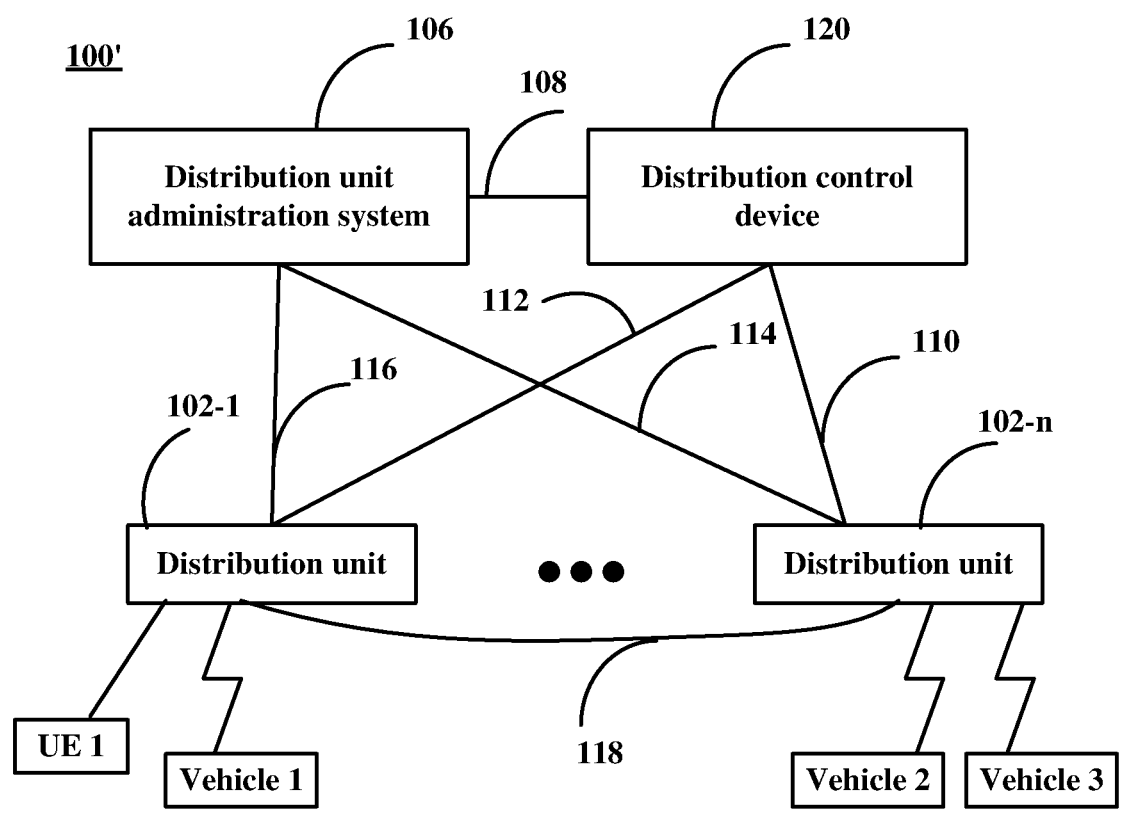
FIG. 1B is a simplified block diagram illustrating a data distribution system according to another embodiment.

FIG. 1B shows a simplified block diagram illustrating a data distribution system 100' according to another embodiment. The difference between the data distribution system 100 and 100' is that the distribution management device 104 of FIG. 1A may comprise a distribution control apparatus 120 and a distribution unit administration apparatus 106 in FIG. 1B. As shown in FIG. 1B, the distribution control apparatus 120 and the distribution unit administration apparatus 106 may communicate with each other through a connection 108. In addition, each of the distribution units 102-1, 102-n may connect to the distribution control apparatus 120 and the distribution unit administration apparatus 106. The distribution unit administration apparatus 106 may perform the distribution unit management function as mentioned above. For example, in LTE, the distribution unit administration apparatus 106 may be a telecommunication device/system incorporating the functionality described herein, for example it may be collocated with a BM-SC and a MBMS-GW/MME. The distribution control apparatus 120 may perform the distribution control function as mentioned above. In this regard, the distribution control apparatus 120 may be implemented in a computing device/system, for example an ITS server or a V2X distribution control function (VDCF).

According to an exemplary embodiment, a novel data distribution solution is proposed for a network/system. While this and other embodiments below are primarily discussed in the context of a V2X system in LTE, it will be recognized by those of ordinary skill that the disclosure is not so limited. In fact, the various aspects of this disclosure are useful in any suitable services in any suitable network that can benefit from the data distribution solution as is described herein, such as wireless network, wired network or other suitable network, for example CDMA, TDMA, FDMA, OFDMA, SC-FDMA, WiMax, internet, intranet and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. A TDMA network may implement a radio technology such as Global System for Mobile Communications (GSM), LTE-TDD. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, LTE-FDD, etc.

In this embodiment, the system may comprise at least one distribution unit and a distribution management device. A distribution unit may be a source of data to be distributed, and/or a target of data to be distributed. A target area may be specified for data, and one or more of the at least one distribution unit may cover the target area. In the proposed solution, a first distribution unit may send a message, containing an indication of a target area related to first data to be distributed, to a distribution management device. The distribution management device may receive the message; then determine one or more second distribution units covering the target area for example based on the target area, and coverage areas and geographical locations of the one or more second distribution units; and send first information comprising at least one target address from the distribution management device to the first distribution unit, wherein the at least one target address is related to the one or more second distribution units covering the target area. Thereafter, the first distribution unit may receive the first information and send the first data to the at least one target address when the message does not contain the first data. More details of the proposed solution will be illustrated hereinafter by way of example with reference to the accompanying drawings.

FIG. 2 is a diagram depicting a process of data distribution method 200 in a data distribution system, which may be performed at a first distribution unit such as the distribution unit 102-1 or 102-*n* of FIG. 1A in accordance with embodiments of the present invention. The solution according to exemplary embodiments may be applicable to a communications network such as LTE, LTE-A and any other networks suitable. In such network, a distribution unit may maintain connections with one or more other distribution units and the distribution management device to engage in a data distribution task.

According to exemplary embodiments, the first distribution unit may send a message, containing an indication of a target area related to first data to be distributed, to a distribution management device, as shown in block 202. The target area may comprise one or more geographical areas, one or more geographical locations, names of one or more target objects such as one or more base stations, or any other suitable area, or any combination thereof. The target area may further comprise direction information, location information, transmission power, route hops or any other suitable information, or any combination thereof. Moreover, the target area can be determined by the first distribution unit such as based on data type, network configuration or the like. In addition, the producer of the data can indicate the target area. For example, the producer may indicate the target area of the data as a coverage area of 500 meters centered on the producer. The indication of the target area can contain information concerning the target area, code corresponding to the target area, or any other suitable indication of the target area. In addition, if the first distribution unit has multiple different target areas, the first distribution unit may have multiple different addresses each of which is corresponding to a different target area. In other word, each different target area may use a different address.

The first data can be of any suitable data type, such as traffic information, event information, advertisement, trading information, business information, promotion information, task information such as a participating sensing task, or any other suitable information, or any combination thereof, and the present disclosure has no limit on it. The first data can be single data or comprise a plurality of data. The data can be generated or collected by the first distribution unit. Alternately or additionally, the data can be received by the first distribution unit from its served devices or from another distribution unit.

In block 204, the first distribution unit may receive first information comprising at least one target address from the distribution management device in response to sending of the message, wherein the at least one target address is related to one or more second distribution units covering the target area. The at least one target address may comprise respective addresses (such as, network addresses, for example IP addresses) of one or more second distribution units covering the target area, or a multicast address. Alternatively or additionally, the target address can be any other suitable address in future network only if the first data can be distributed/routed to the one or more second distribution units when the first data is sent through the target address.

In block 206, the first distribution unit may send the first data to the at least one target address when the message does not contain the first data. The first distribution unit may send the first data to the at least one target address in a different way depending on the content of the at least one target address.

In an embodiment, the at least one target address may comprise respective addresses of the one or more second distribution units covering the target area, and the first distribution unit may send the first data to the respective addresses of one or more second distribution units covering the target area when the message does not contain the first data. For example, the first distribution unit may send the first data to the respective addresses of one or more second distribution units through unicast or multicast. The first distribution unit may use existing or future multicast technologies. When there are other data such as next data to be distributed in the same target area, the first distribution unit can send the next data to the respective addresses of one or more second distribution units covering the target area through unicast or multicast. It is noted that the first distribution unit may also be located within the target area.

In an embodiment, the first information may further comprise respective coverage areas and geographical locations of the one or more second distribution units, and the first distribution unit may store the addresses, the coverage areas and geographical locations of the one or more second distribution units for example in its storage device. This information can be used by the first distribution unit in the future for example to determine respective addresses of one or more second distribution units covering the another target area for another data. In this way, if the first distribution unit can determine that by itself, then it can save time, signaling load, or load on the distribution management device.

In an embodiment, the at least one target address may comprise a first multicast address, and the first distribution unit may send the first data to a first multicast group identified by the first multicast address when the message does not contain the first data. For example, the first distribution unit may directly send the first data to the first multicast address in an IP network. In addition, when there are other data such as next data to be distributed in the same target area, the first distribution unit may send the next data to the first multicast group identified by the first multicast address.

In an embodiment, the first information may further comprise a first indication of distribution approach, the at least one target address may comprise a second multicast address. It is noted that the first information may further comprise other suitable information such as an address such as IP address of the distribution management device. The first indication of distribution approach may be an indication of predefined multicast approach. For example, the first indication of distribution approach may indicate that a multicast group is identified by a multicast address (such as the second multicast address) and an address of a distribution unit (such as the first distribution unit) and that the data (such as the first data) is to be distributed through the multicast group. Alternatively, the first indication of distribution approach may be of any suitable form, such as a predefined flag known by the first distribution unit and the distribution management device.

In this embodiment, the first distribution unit may, based on the first indication of distribution approach, send the first data to the second multicast group identified by the second multicast address and the address of the first distribution unit when the message does not contain the first data, and send next data to the second multicast group identified by the second multicast address and the address of the first distribution unit for distributing the next data in the target area.

According to various embodiments, the distribution management device may comprise a distribution control apparatus 120 and a distribution unit administration apparatus 106 as shown in FIG. 1B. The two apparatuses may be located in different locations or same location. In this case, the first distribution unit may send the message to the distribution control apparatus 120, and receive the first information from the distribution unit administration apparatus 106 in response to sending of the message.

According to various embodiments, the message further contains the first data. For example, the first data may be distributed to the one or more second distribution units covering the target area by the distribution management device. As an example, when the distribution management device may comprise a distribution control apparatus 120 and a distribution unit administration apparatus 106 as shown in FIG. 1B, the first data may be distributed to the one or more second distribution units by the distribution control apparatus 120. In this way, if the first distribution unit may only have one data to be distributed, then it can save time due to the direct distribution of the distribution management device.

According to various embodiments, the message may further contain the first distribution unit's address, coverage area, and geographical location when the first distribution unit is the source for specific data. The distribution management device can store this information and use this information to determine one or more distribution units covering a specific target area. As an example, the first distribution unit may register or update this information together with its target area with the distribution management device. It is noted that the first distribution unit's address is used in the target area since each target area may receive the data from multiple distribution unit, thus requiring the first distribution unit's address to differentiate the source distribution unit.

In an embodiment, the information about one or more third distribution units may be stored in the first distribution unit. This information may comprise the addresses, network name, the coverage areas and geographical locations or the like of the one or more third distribution units. For example, the first distribution unit may obtain/request this information from the distribution management device or from one or more third distribution units directly. In this case, the first distribution unit may determine whether an area covered by the one or more third distribution units is able to cover the target area or not. The first distribution unit may perform the determination by using any suitable approaches. For example, the first distribution unit may perform the determination based on the target area and coverage areas and geographical locations of the one or more third distribution units.

In this embodiment, if the determination is negative, then the first distribution unit may perform the operation of block 202. If the determination is positive, then the first distribution unit may send the first data and next data to one or more of the third distribution units whose coverage area is covering the target area. The sending may be performed through unicast or multicast.

In an embodiment, the first distribution unit may be a destination of other data distributed by other distribution unit and a multicast group may be identified by a multicast address. In this case, the first distribution unit may receive a third multicast address from the distribution management device; join a third multicast group identified by the third multicast address; and receive data from the third multicast group, wherein the first distribution unit is a destination of data to be distributed by the third multicast group identified by the third multicast address.

In an embodiment, the first distribution unit may be a destination of another data distributed by another distribution unit and a multicast group may be identified by a multicast address and an address of a distribution unit. In this case, the first distribution unit may receive an address of a fourth distribution unit from the distribution management device; receive a fourth multicast address and a second indication of distribution approach from the distribution management device; join a fourth multicast group identified by the fourth multicast address and the address of the fourth distribution unit based on the second indication of distribution approach; and receive data from the fourth multicast group, wherein the fourth distribution unit is a source of another data to be distributed and the first distribution unit is a destination of the another data to be distributed, and the fourth multicast address and the second indication of distribution approach may be same for each distribution unit of the fourth multicast group.

FIG. 3 is a diagram depicting a process of data distribution method 300 in a data distribution system, which may be performed at a distribution management device such as the distribution management device 104 of FIG. 1A in accordance with embodiments of the present invention. The solution according to exemplary embodiments may be applicable to a communications network such as LTE, LTE-A and any other networks suitable for data distribution. In such network, a distribution unit may maintain connections with one or more other distribution units and the distribution management device to engage in a data distribution task. The distribution management device may be able to obtain the information of distribution units, such as address, coverage area, target area and geographical location for each distribution unit, or other suitable information. This information can be stored in the distribution management device or in an external device which can be accessed by the distribution management device. It is noted that some parts of FIG. 3 have been discussed with reference to FIG. 2, and these parts will not be discussed in detail for brevity.

According to exemplary embodiments, the distribution management device may receive a message, containing an indication of a target area related to first data to be distributed from a first distribution unit in block 302. The message, the indication of a target area, and the first data has been discussed above.

After this, the distribution management device may determine one or more second distribution units covering the target area in block 304. The determination performed by the distribution management device may be similar to that of the first distribution unit as described above. In an embodiment, the distribution management device may determine one or more second distribution units covering the target area based on the target area and coverage areas and geographical locations of the one or more second distribution units.

After this, the distribution management device may send first information comprising at least one target address to the first distribution unit in block 306, wherein the at least one target address is related to the one or more second distribution units covering the target area.

In an embodiment, the at least one target address may comprise respective addresses of the one or more second distribution units covering the target area. This information can be stored and used by the first distribution unit as mentioned above.

In an embodiment, the first information further comprises respective coverage areas and geographical locations of the one or more second distribution units. This information together with the addresses of the one or more second distribution units can be stored and used by the first distribution unit as mentioned above.

In an embodiment, the at least one target address comprises a first multicast address and the distribution management device may send the first multicast address to the one or more second distribution units. Then, each of the one or more second distribution units may receive and get the first multicast address, join a first multicast group identified by the first multicast address, and receive data (e.g., the first data) from the first multicast group, finally it can use the data and/or distribute (for example broadcast) it to its served devices/users.

In an embodiment, the first information may further comprise a first indication of distribution approach, the at least one target address may comprise a second multicast address. For example, the first indication of distribution approach may indicate that data (such as the first data) may be distributed through multicast and that a multicast group may be identified by a multicast address (such as the second multicast address) and an address of source (such as the first distribution unit) of the data. In this embodiment, the distribution management device may send an address of the first distribution unit to the one or more second distribution units. For example, the distribution management device may send the address of the first distribution unit to the one or more second distribution units when it receives the target area from the first distribution unit and determines that the one or more second distribution units covers the target area. In addition, the distribution management device may send the first information to the one or more second distribution units. In this way, each of the one or more second distribution units can get the first indication of distribution approach and the second multicast address, then they may join a multicast group identified by the first indication of distribution approach and the second multicast address and receive data from this multicast group. It is noted that, in other embodiments, the address of the first distribution unit can be sent to the one or more second distribution units together with the first information, thereby reducing message quantity in the network and load of the distribution management device.

In an embodiment, the distribution management device may comprise a distribution control apparatus and a distribution unit administration apparatus, and the method 300 further comprises: receiving, at the distribution control apparatus, the message; and sending, at the distribution control apparatus, a request to the distribution unit administration apparatus to enable the distribution unit administration apparatus to send the first information. In an embodiment where the at least one target address may comprise a first multicast address, the request may contain the addresses of the first distribution unit and the one or more second distribution units and an indication of multicast function activation for these addresses. In another embodiment where the first information further may comprise a first indication of distribution approach and the at least one target address may comprise a second multicast address, the request may contain the addresses of the first distribution unit and the one or more second distribution units, the first indication of distribution approach and an indication of multicast function activation for these addresses. In addition, the request may also contain the first multicast address if the first multicast address is allocated by the distribution control apparatus, as well as other suitable information. It is noted that the indication of multicast function activation may be of any suitable form, for example the request may be a multicast function activation request.

In an embodiment, the distribution management device may comprise a distribution control apparatus and a distribution unit administration apparatus, and the method 300 may further comprise: receiving, at the distribution unit administration apparatus, a request from the distribution control apparatus, wherein the request may request the distribution unit administration apparatus to send the first information. The method 300 may further comprise: sending, at the distribution unit administration apparatus, the first information as mentioned above. It is noted that the first information may be included in a multicast function activation request.

In an embodiment, the message may further contain the first data, and the method 300 may further comprise: sending the first data to the one or more second distribution units covering the target area. For example, as mentioned above, the distribution management device may send the first data to the one or more second distribution units covering the target area through unicast.

In an embodiment, the message may further contain the first distribution unit's address, coverage area, and geographical location, and the method 300 may further comprise storing the first distribution unit's address, coverage area, and geographical location. In this way, the distribution management device may collect the information concerning the distribution units and this information may be used to determine one or more distribution units covering a specific target area for example.

In an embodiment, the method 300 may send a third multicast address to the first distribution unit, wherein the first distribution unit is a destination of data to be distributed by a third multicast group identified by the third multicast address. For example, another first distribution unit may distribute data to a specific target area in which the first distribution unit is located, and a distribution approach for the data may be a multicast approach. In this case, the distribution management device may send the third multicast address to the first distribution unit.

In an embodiment, the method 300 may further comprise: sending an address of a fourth distribution unit to the first distribution unit; sending a fourth multicast address and a second indication of distribution approach to the first distribution unit, wherein the fourth distribution unit is a source of another data to be distributed and the first distribution unit is a destination of another data to be distributed. In addition, the fourth multicast address and the second indication of distribution approach may be same for each distribution unit of the fourth multicast group due to that each fourth multicast group may be identified by the fourth multicast address and an address of a specific fourth distribution unit.

Figure 4:
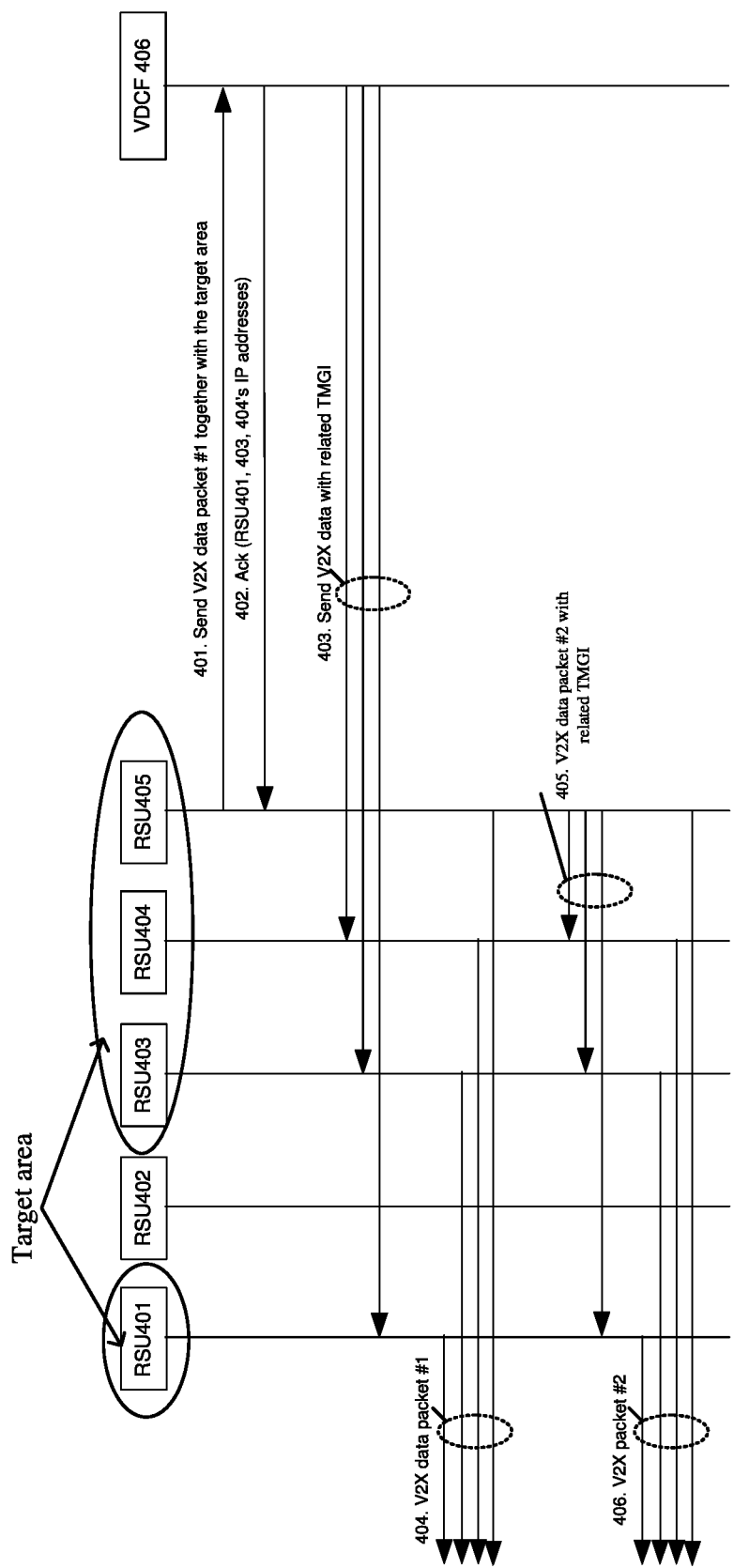
FIG. 4 is a diagram depicting a process of data distribution method in a data distribution system according to still another embodiment.

FIG. 4 is a diagram depicting a process of data distribution method in a data distribution system according to still another embodiment. In this embodiment, the data distribution method is implemented in an exemplary V2X system, which may comprise a VDCF 406 which may be implemented in a server such as an ITS server, or any other nodes, for example, the BM-SC, MBMS-GW, RSU, etc. The V2X system further comprises RSUs 401, 402, 403, 404, 405, which may be implemented in eNodeBs. In the V2X system, RSU 405 may be the first distribution unit which has one or more V2X packets to be distributed. The target area for the one or more V2X packets is indicated by two ellipses. The VDCF 406 may be the distribution management device.

As shown in FIG. 4, in phase 401, RSU 405 may send V2X data packet #1 together with the target area to VDCF 406. VDCF 406 may determine one or more distribution units covering the target area, for example, the VDCF 406 may determine that RSUs 401, 403, 404, 405 cover the target area. The VDCF 406 may then send an acknowledgement to RSU 405, which may comprise RSU 401, 403, 404's IP addresses. Note that the acknowledgement may also contain RSU405's IP address if RSU 405 cannot determine by itself that it is within the target area. In this embodiment, the RSU 405 can determine by itself that it is within the target area. Since V2X data packet #1 has been received by VDCF 406, VDCF 406 may know that it should distribute V2X data packet #1 by itself. VDCF 406 may send V2X data packet #1 with related TMGI to RSUs 401, 403, 404 respectively in phase 403. RSUs 401, 403, 404 and 405 may broadcast V2X data packet #1 to their served UEs or users in phase 404.

If V2X data packet #1 is only packet or the first packet for the target area to be distributed, then the above method can save distribution time since VDCF 406 can directly distribute V2X data packet #1 to RSUs 401, 403, 404 without the requirement of RSU 405 to distribute the V2X data packet #1 to RSUs 401, 403, 404. Therefore, if RSU 405 only has one packet or the first packet for the target area to be distributed, it can send the packet together with the target area to VDCF 406.

If RSU 405 has more packets to be distributed in the same target area, then it can distribute these packets by itself. For example, in phase 405, RSU 405 may send V2X data packet #2 with related TMGI to RSUs 401, 403, 404 such as through unicast. In another embodiment, RSU 405 may send V2X data packet #2 to RSUs 401, 403, 404 such as through multicast. In phase 406, RSUs 401, 403, 404 and 405 may broadcast V2X data packet #2 to their served UEs or users.

Figure 5:
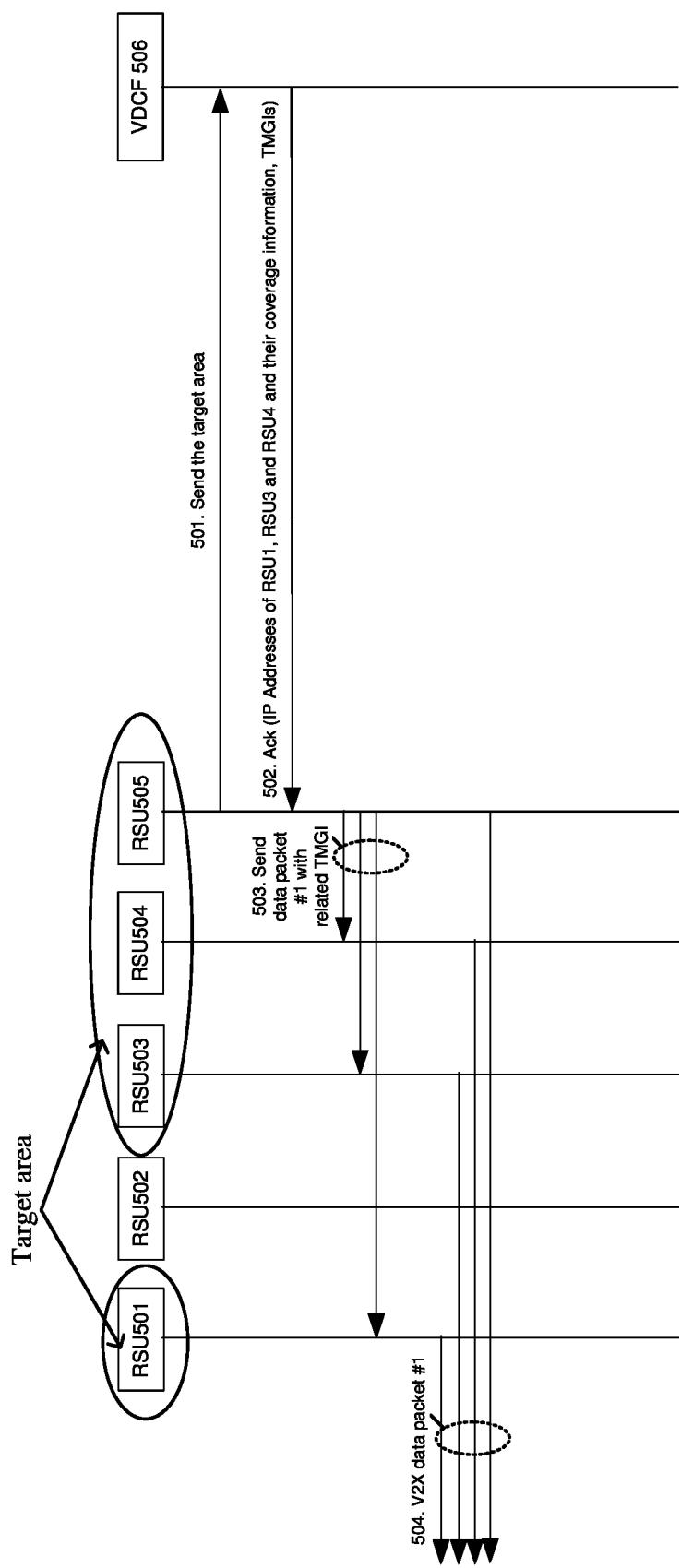
FIG. 5 is a diagram depicting a process of data distribution method in a data distribution system according to still another embodiment.

FIG. 5 is a diagram depicting a process of data distribution method in a data distribution system according to still another embodiment. In this embodiment, the data distribution method is implemented in an exemplary V2X system, which may comprise a VDCF 506 which may be implemented in a server such as an ITS server. The V2X system may further comprise RSUs 501, 502, 503, 504, 505 which may be implemented in eNodeBs. In the V2X system, RSU 505 may be the first distribution unit which has one or more V2X packets to be distributed. The target area for the one or more V2X packets is indicated by two ellipses. The VDCF 506 may be the distribution management device.

As shown in FIG. 5, in phase 501, RSU 505 may send the target area to the VDCF 506. VDCF 506 may determine one or more distribution units covering the target area, for example, VDCF 506 may determine that RSUs 501, 503, 504, 505 cover the target area. VDCF 506 may then send an acknowledgement to RSU 505, which may comprise RSUs 501, 503, 504's IP addresses, their coverage information, and TMGI in phase 502. Note that the acknowledgement may also contain the RSU 505's IP address if RSU 505 cannot determine by itself that it is within the target area. In this embodiment, RSU 505 can determine by itself that it is within the target area. RSU 505 may send the V2X data packet #1 with related TMGI to RSUs 501, 503, 504 such as through unicast or multicast in phase 503. RSUs 501, 503, 504 and 505 may broadcast V2X data packet #1 to their served UEs or users in phase 504.

If RSU 505 has more packets to be distributed in the same target area, then it can distribute these packets to RSUs 501, 503, 504 such as through unicast or multicast.

The difference between the data distribution methods shown in FIG. 5 and FIG. 4 is whether V2X data packet #1 is sent to VDCF or not. If the V2X data packet #1 is not sent to VDCF, then it can reduce the load on the VDCF, otherwise it can save time of data distribution. Therefore, in practice, different data distribution services can select different strategy such as according to service types, priority, and so on.

Figure 6:
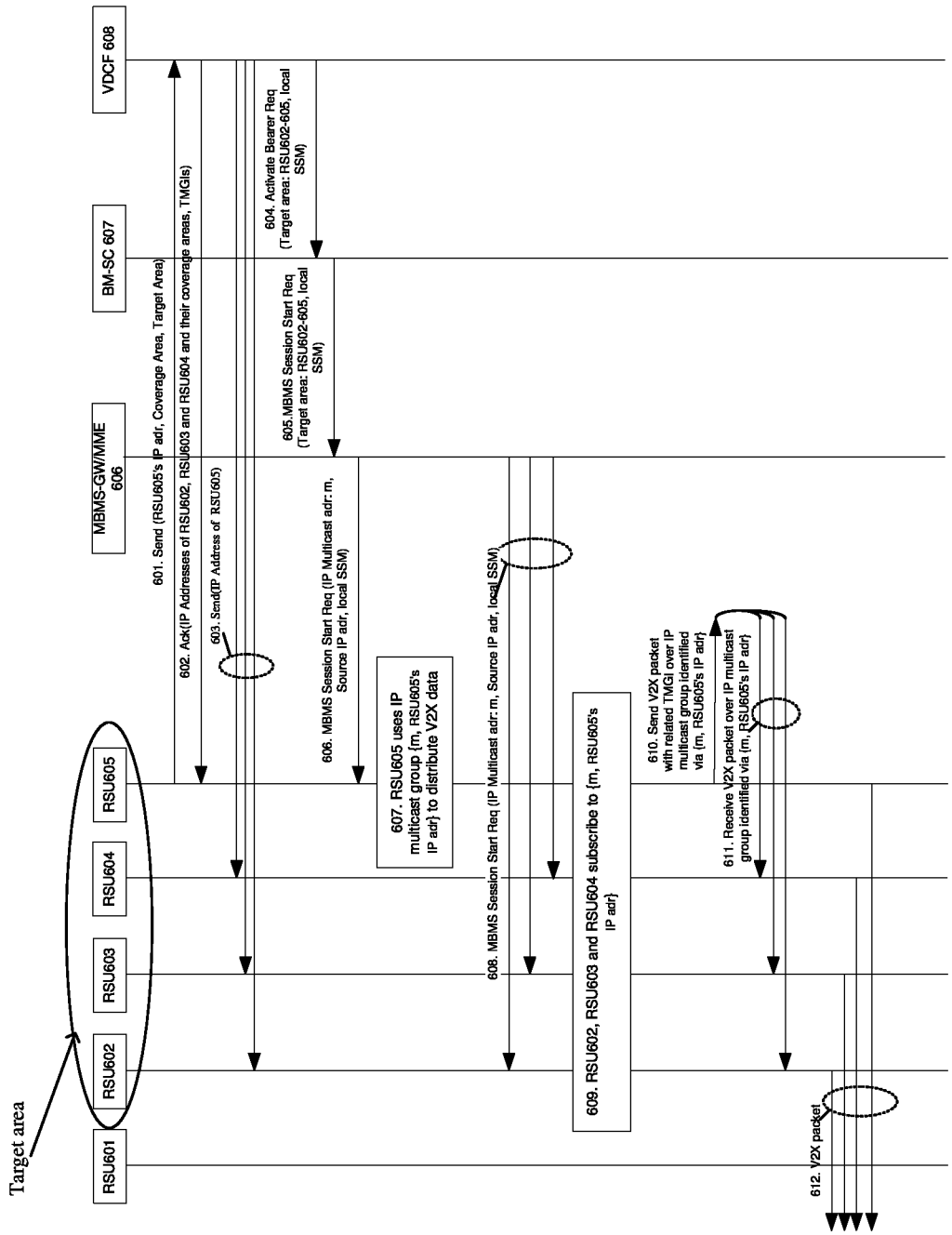
FIG. 6 is a diagram depicting a process of data distribution method in a data distribution system according to still another embodiment.

FIG. 6 is a diagram depicting a process of data distribution method in a data distribution system according to still another embodiment. In this embodiment, the data distribution method is implemented in an exemplary V2X system in LTE network. The exemplary V2X system may comprise a VDCF 608 which may be implemented in a server such as an ITS server, MBMS-GW/MME 606, BM-SC 607, and RSUs 601, 602, 603, 604, 605 which may be implemented in eNodeBs. In the V2X system, RSU 605 is the first distribution unit which has one or more V2X packets to be distributed. The target area for the one or more V2X packets is indicated by an ellipse. In this embodiment, the VDCF 608 may be the distribution control apparatus, and MBMS-GW/MME 606, and BM-SC 607 may be the distribution unit administration apparatus.

As shown in FIG. 6, the RSU 605 may send/register RSU 605's IP address, coverage area and target area to VDCF 608 in phase 601.

VDCF 608 may determine one or more distribution units covering the target area, for example, VDCF 608 determine that RSUs 602, 603, 604, 605 cover the target area. VDCF 608 may then send an acknowledgement (such as registration acknowledgement) to RSU 605 in phase 602, which may comprise the RSUs 602, 603, 604's IP addresses, their coverage areas and TMGIs. Note that the acknowledgement may also contain RSU 605's IP address if RSU 605 cannot determine by itself that it is within the target area. In this embodiment, the RSU 605 can determine by itself that it is within the target area.

In phase 603, VDCF 608 may send the IP address of RSU 605 to RSUs 602, 603 and 604. When RSUs 602, 603 and 604 receives the IP address of RSU 605, they may know that RSU 605 may send data to them through multicast. If RSUs 602, 603 and 604 have activated a MBMS service, for example they have received a MBMS Session Start Request as shown in phase 608 previously, then they may join/subscribe to a multicast group {m, RSU605's IP address} as shown in phase 609.

In phase 604, VDCF 608 may send an Activate Bearer Request to BM-SC 607 which may comprise the target area: RSUs 602-605, and an indication of distribution approach: local SSM. In other embodiment, if the Activate Bearer Request has been sent to BM-SC 607 previously, then the phase 604 may be omitted.

In phase 605, when the BM-SC 607 receives the Activate Bearer Request from VDCF 608, it may send a MBMS Session Start Request to MBMS-GW/MME 606, which may comprise the target area: RSUs 602-605, and the indication of distribution approach: local SSM. In other embodiment, if the MBMS Session Start Request has been sent to RSUs 602-605 previously, then the phase 605 may be omitted.

In phase 606, after MBMS-GW/MME 606 receives the MBMS Session Start Request from BM-SC 607, it may send a MBMS Session Start Request to RSU 605, which may comprise an IP multicast address: m, a source IP address, and the indication of distribution approach: local SSM.

In phase 607, RSU 605 may use an IP multicast group {m, RSU 605's IP address} to distribute V2X data. It is noted that the source IP address should be replaced with the RSU 605's IP address.

In phase 608, MBMS-GW/MME 606 may send a MBMS Session Start Request to RSUs 602, 603 and 604, which may comprise the IP multicast address: m, the source IP address, and the indication of distribution approach: local SSM. It is noted that the content of the MBMS Session Start Request in phases 606 and 608 may be same. In other words, the IP multicast address: m, the source IP address, and the indication of distribution approach: local SSM may be same for each RSU.

In phase 609, RSU 602, RSU 603 and RSU 604 may subscribe to a multicast group {m, RSU605's IP address} after they received the MBMS Session Start Request. In other embodiments, if the MBMS sessions have been activated previously, RSU 602, RSU 603 and RSU 604 may subscribe to a multicast group {m, RSU605's IP address} when they receives the IP address of RSU 605. It is noted that in existing MBMS services, RSU 602, RSU 603 and RSU 604 may subscribe to a multicast group {m, the source IP address} after they received a MBMS Session Start Request, while in this embodiment, the source IP address should be replaced with the IP address of RSU 605.

In phase 610, RSU 605 may send the V2X data packet with related TMGI over IP multicast group identified via {m, RSU605's IP address}.

In phase 611, RSU 602, RSU 603 and RSU 604 may receive the V2X packet over the IP multicast group identified via {m, RSU605's IP address}.

In phase 612, RSU 602, 603, 604 and 605 may broadcast the V2X data packet to their served UEs or users.

If RSU 605 has more packets to be distributed in the same target area, then it can send the more packets with related TMGI over the IP multicast group identified via {m, RSU605's IP address}.

In addition, in the prior art, each RSU may broadcast different set of data over the air interface, each RSU therefore may need to be in a different IP multicast group. Taking RSU 601 as an example, an ITS server may activate a MBMS bearer for RSU 601, for example the ITS server may send an activate bearer request (MBMS area: RSU 601) to BM-SC. When the BM-SC receives this request, it may initiates a MBMS Session Start procedure for RSU 601, for example, it may send a MBMS Session Start Request (MBMS area: RSU 601) to MBMS-GW. After the MBMS-GW has received the MBMS Session Start Request (MBMS area: RSU 601), it may allocates an IP multicast group address for RSU 601, such as IP multicast address: m1, then it may send a MBMS Session Start Request (IP Multicast address: m1, Source IP address) to RSU 601. It is noted that the above procedure should be performed for each RSU, therefore, it has the signalling load issue and IP multicast group load issue as mentioned above. In addition, the application data is first sent to BM-SC. This can cause long transmission delay (e.g. 30-40 ms latency for RSU->BM-SC->RSU).

However, the solution according to the present disclosure can at least avoid or mitigate the above issues. For example, the VDCF or ITS server may only initiate one Activate MBMS Bearer procedure. BM-SC may initiate one MBMS Session Start procedure for RSU 601, RSU 602, RSU 603, RSU 604 and RSU 605. The MBMS-GW may only allocate one IP multicast group address, e.g. m. Each RSU will use the previous received source RSU IP address to identify the related IP multicast groups. For example, in FIG. 6, RSU 602 use (IP Multicast address: m, RSU 605's IP address) to receive V2X packets initiated by RSU 605. RSU 602 use (IP Multicast address: m, RSU 603's IP address) to receive V2X packets initiated by RSU 603.

Figure 7:
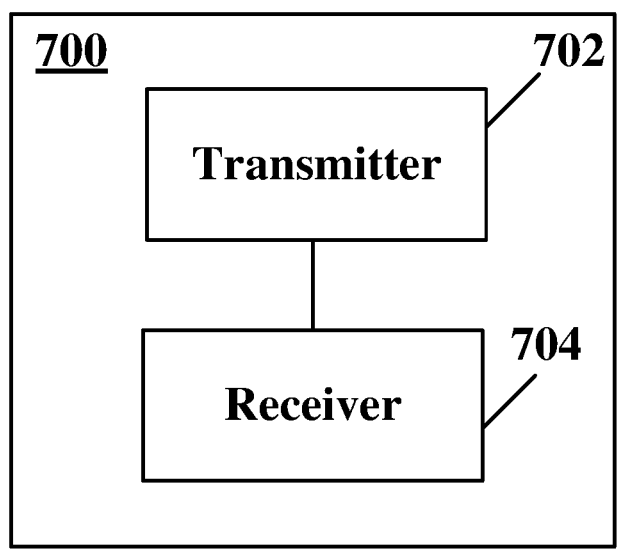
FIG. 7 is a simplified block diagram illustrating an apparatus according to an embodiment.
Figure 8:
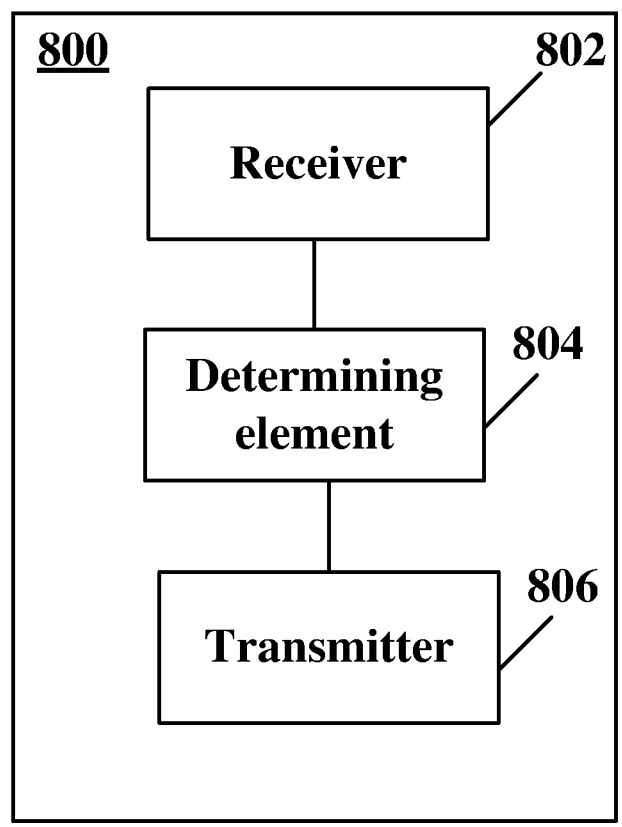
FIG. 8 is a simplified block diagram illustrating an apparatus according to an embodiment.
Figure 9:
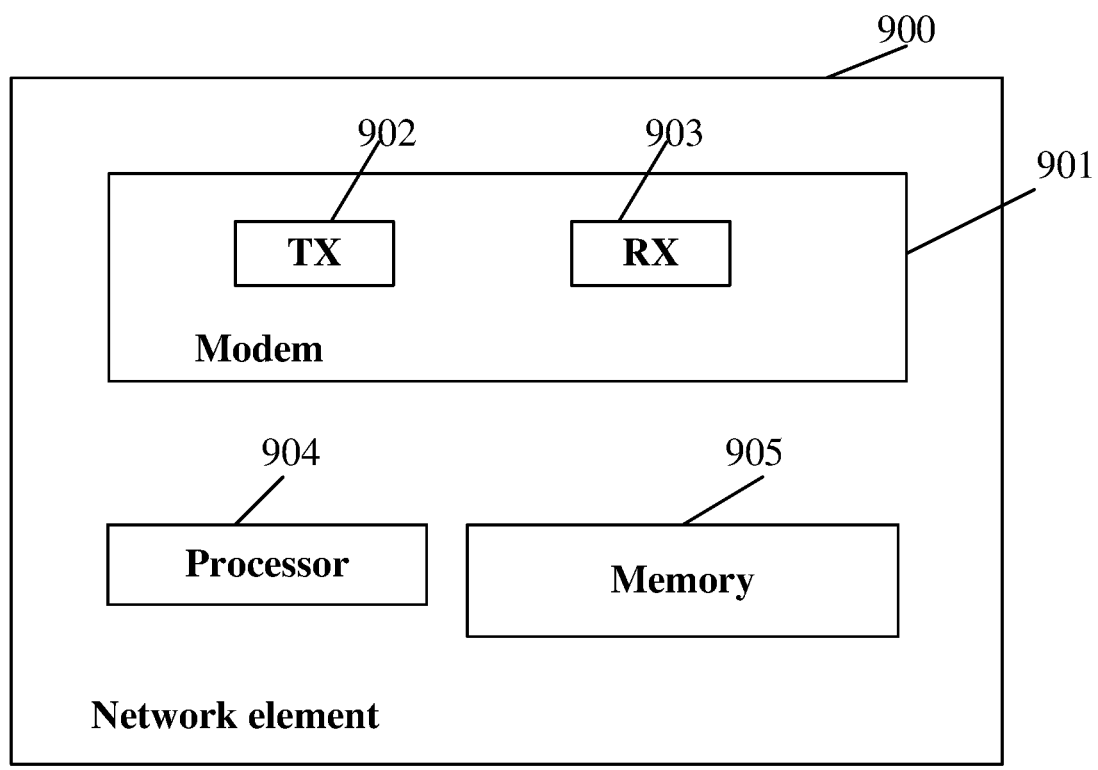
FIG. 9 is a simplified block diagram illustrating an apparatus according to an embodiment.

Under the same inventive concept, FIGS. 7-9 are simplified block diagrams illustrating apparatuses useful in implementing the methods for data distribution as described above. The embodiments will be described below in combination with these figures. For same parts as in the previous embodiments, the description thereof may be omitted as appropriate.

FIG. 7 depicts a simplified block diagram illustrating an apparatus 700 useful in implementing the methods for data distribution as described above. As shown in FIG. 7, the apparatus 700 may comprise a transmitter 702 and a receiver 704. The transmitter 702 may be configured to send a message, containing an indication of a target area related to first data to be distributed, from a first distribution unit to a distribution management device. The receiver 704 may be configured to receive first information comprising at least one target address from the distribution management device in response to sending of the message, wherein the at least one target address is related to one or more second distribution units covering the target area. In addition, the transmitter 702 may be further configured to send the first data to the at least one target address when the message does not contain the first data.

In an embodiment, the at least one target address may comprise respective addresses of the one or more second distribution units covering the target area, and the transmitter 702 may be further configured to send the first data to the respective addresses of one or more second distribution units covering the target area when the message does not contain the first data; and send next data to the respective addresses of one or more second distribution units covering the target area, for distributing the next data in the target area.

In an embodiment, the first information further comprises respective coverage areas and geographical locations of the one or more second distribution units, and the apparatus further comprises a storage (not shown) configured to store the addresses, the coverage areas and geographical locations of the one or more second distribution units.

In an embodiment, the at least one target address comprises a first multicast address, and the transmitter 702 may be further configured to send the first data to a first multicast group identified by the first multicast address when the message does not contain the first data; and send next data to the first multicast group identified by the first multicast address for distributing the next data in the target area.

In an embodiment, the first information may further comprise a first indication of distribution approach, the at least one target address comprises a second multicast address, and the transmitter 702 may be further configured to: based on the first indication of distribution approach, send the first data to the second multicast group identified by the second multicast address and the address of the first distribution unit when the message does not contain the first data; and send next data to the second multicast group identified by the second multicast address and the address of the first distribution unit for distributing the next data in the target area.

In an embodiment, wherein the distribution management device comprises a distribution control apparatus and a distribution unit administration apparatus, the message is sent to the distribution control apparatus, and the first information is received from the distribution unit administration apparatus.

In an embodiment, the message may further contain the first data.

In an embodiment, the message may further contain the first distribution unit's address, coverage area, and geographical location.

In an embodiment, the information about one or more third distribution units may be stored in the first distribution unit, the apparatus 700 may further comprise: a determining element (not shown) configured to determine whether an area covered by the one or more third distribution units is able to cover the target area or not. And the transmitter 702 may be further configured to send the message when the determination being negative; or send the first data and next data to one or more of the third distribution units whose coverage area is covering the target area when the determination being positive.

In an embodiment, the apparatus 700 may further comprise: the receiver 704 further configured to receive a third multicast address from the distribution management device; a joining element (not shown) configured to join a third multicast group identified by the third multicast address; and the receiver 704 further configured to receive data from the third multicast group, wherein the first distribution unit is a destination of data to be distributed by the third multicast group identified by the third multicast address.

In an embodiment, the receiver 704 may be configured to receive an address of a fourth distribution unit from the distribution management device; and receive a fourth multicast address and a second indication of distribution approach from the distribution management device. The joining element may be configured to join a fourth multicast group identified by the fourth multicast address and the address of the fourth distribution unit based on the second indication of distribution approach. The receiver 704 may be configured to receive data from the fourth multicast group, wherein the fourth distribution unit is a source of another data to be distributed and the first distribution unit is a destination of the another data to be distributed, and the fourth multicast address and the second indication of distribution approach are same for each distribution unit of the fourth multicast group.

In an embodiment, the first distribution unit may have multiple different target areas and multiple different addresses, wherein a different target area may use a different address.

FIG. 8 depicts a simplified block diagram illustrating an apparatus 800 useful in implementing the methods for data distribution as described above. As shown in FIG. 8, the apparatus 800 may comprise a receiver 802, a determining element 804 and a transmitter 806. The receiver 802 may be configured to receive a message, containing an indication of a target area related to first data to be distributed from a first distribution unit. The determining element 804 may be configured to determine one or more second distribution units covering the target area. The transmitter 806 may be configured to send first information comprising at least one target address from a distribution management device to the first distribution unit, wherein the at least one target address is related to the one or more second distribution units covering the target area.

In an embodiment, the at least one target address may comprise respective addresses of the one or more second distribution units covering the target area.

In an embodiment, the first information may further comprise respective coverage areas and geographical locations of the one or more second distribution units.

In an embodiment, the at least one target address may comprise a first multicast address and the transmitter 806 may be further configured to send the first multicast address to the one or more second distribution units.

In an embodiment, the first information may further comprises a first indication of distribution approach, the at least one target address comprises a second multicast address, and the transmitter 806 may be further configured to send an address of the first distribution unit to the one or more second distribution units; and send the first information to the one or more second distribution units.

In an embodiment, the distribution management device may comprise a distribution control apparatus and a distribution unit administration apparatus, and the apparatus 800 may further comprise: a first receiving element (not shown), at the distribution control apparatus, configured to receive the message, and a first sending element (not shown), at the distribution control apparatus, configured to send a request to the distribution unit administration apparatus to enable the distribution unit administration apparatus to send the first information.

In an embodiment, the distribution management device may comprise a distribution control apparatus and a distribution unit administration apparatus, and the apparatus 800 may further comprise: a second receiving element (not shown), at the distribution unit administration apparatus, configured to receive a request from the distribution control apparatus, wherein the request requests the distribution unit administration apparatus to send the first information; and a second sending element (not shown), at the distribution unit administration apparatus, configured to send the first information.

In an embodiment, the message may further contain the first data, and the transmitter 806 may be further configured to send the first data to the one or more second distribution units covering the target area.

In an embodiment, the message may further contain the first distribution unit's address, coverage area, and geographical location, and the apparatus 800 may further comprise: a storage (not shown) configured to store the first distribution unit's address, coverage area, and geographical location.

In an embodiment, the transmitter 806 may be further configured to send a third multicast address to the first distribution unit, wherein the first distribution unit is a destination of data to be distributed by a third multicast group identified by the third multicast address.

In an embodiment, the transmitter 806 may be further configured to send an address of a fourth distribution unit to the first distribution unit; and send a fourth multicast address and a second indication of distribution approach to the first distribution unit; wherein the fourth distribution unit is a source of another data to be distributed and the first distribution unit is a destination of another data to be distributed, and the fourth multicast address and the second indication of distribution approach are same for each distribution unit of the fourth multicast group.

In an embodiment, the first distribution unit may have multiple different target areas and multiple different addresses, wherein a different target area may use a different address.

According to an aspect of the disclosure, it is provided a network element. FIG. 9 depicts a network element 900 useful in implementing the methods for data distribution as described above. As shown in FIG. 9, the network element 900 comprises a processing device 904, a memory 905, and a radio modem subsystem 901 in operative communication with the processor 904. The radio modem subsystem 901 comprises at least one transmitter 902 and at least one receiver 903. While only one processor is illustrated in FIG. 9, the processing device 904 may comprises a plurality of processors or multi-core processor(s). Additionally, the processing device 904 may also comprise cache to facilitate processing operations.

Computer-executable instructions can be loaded in the memory 905 and, when executed by the processing device 904, cause the network element 900 to implement the above-described methods for data distribution in a wireless network. In particular, the computer-executable instructions can cause the network element 900 to send a message, containing an indication of a target area related to first data to be distributed, from a first distribution unit to a distribution management device; to receive first information comprising at least one target address from the distribution management device in response to sending of the message, wherein the at least one target address is related to one or more second distribution units covering the target area; and to send the first data to the at least one target address when the message does not contain the first data.

In an embodiment, wherein the at least one target address comprises respective addresses of the one or more second distribution units covering the target area, the computer-executable instructions can cause the network element 900 to send the first data to the respective addresses of one or more second distribution units covering the target area when the message does not contain the first data; and to send next data to the respective addresses of one or more second distribution units covering the target area, for distributing the next data in the target area.

In an embodiment, wherein the first information further comprises respective coverage areas and geographical locations of the one or more second distribution units, and the computer-executable instructions can cause the network element 900 to store the addresses, the coverage areas and geographical locations of the one or more second distribution units.

In an embodiment, wherein the at least one target address comprises a first multicast address, the computer-executable instructions can cause the network element 900 to send the first data to a first multicast group identified by the first multicast address when the message does not contain the first data; and to send next data to the first multicast group identified by the first multicast address for distributing the next data in the target area.

In an embodiment, wherein the first information further comprises a first indication of distribution approach, the at least one target address comprises a second multicast address, and the computer-executable instructions can cause the network element 900 to: based on the first indication of distribution approach, send the first data to the second multicast group identified by the second multicast address and the address of the first distribution unit when the message does not contain the first data; and send next data to the second multicast group identified by the second multicast address and the address of the first distribution unit for distributing the next data in the target area.

In an embodiment, wherein the distribution management device comprises a distribution control apparatus and a distribution unit administration apparatus, the message is sent to the distribution control apparatus, and the first information is received from the distribution unit administration apparatus.

In an embodiment, wherein the message further contains the first data.

In an embodiment, wherein the message further contains the first distribution unit's address, coverage area, and geographical location.

In an embodiment, wherein the information about one or more third distribution units is stored in the first distribution unit, the computer-executable instructions can cause the network element 900 to determine whether an area covered by the one or more third distribution units is able to cover the target area or not; send the message when the determination being negative; or send the first data and next data to one or more of the third distribution units whose coverage area is covering the target area when the determination being positive.

In an embodiment, the computer-executable instructions can cause the network element 900 to receive a third multicast address from the distribution management device; join a third multicast group identified by the third multicast address; and receive data from the third multicast group, wherein the first distribution unit is a destination of data to be distributed by the third multicast group identified by the third multicast address.

In an embodiment, the computer-executable instructions can cause the network element 900 to receive an address of a fourth distribution unit from the distribution management device; receive a fourth multicast address and a second indication of distribution approach from the distribution management device; join a fourth multicast group identified by the fourth multicast address and the address of the fourth distribution unit based on the second indication of distribution approach; and receive data from the fourth multicast group, wherein the fourth distribution unit is a source of another data to be distributed and the first distribution unit is a destination of the another data to be distributed, and the fourth multicast address and the second indication of distribution approach are same for each distribution unit of the fourth multicast group.

In an embodiment, the first distribution unit may have multiple different target areas and multiple different addresses, wherein a different target area may use a different address.

According to an aspect of the disclosure it is provided a computer program product comprising at least one non-transitory computer-readable storage medium having computer-executable program instructions stored therein, the computer-executable instructions being configured to, when being executed, cause an apparatus such as apparatus 800 to operate as described above.

According to an aspect of the disclosure it is provided a computer program product comprising at least one non-transitory computer-readable storage medium having computer-executable program instructions stored therein, the computer-executable instructions being configured to, when being executed, cause an apparatus such as apparatus 700 or network element 900 to operate as described above.

It is noted that any of the components of apparatus 700, 800 and network element 900 can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method comprising:
    sending, by a first distribution unit, a message to a distribution management device, the message including an indication of a target area related to first data to be distributed;
    receiving, by a first distribution unit and from the distribution management device, first information comprising at least one target address related to one or more second distribution units covering the target area, the first information received in response to the sending of the message; and
    when the message does not include the first data, sending, by the first distribution unit, the first data to the at least one target address, wherein when the message does include the first data, the first distribution unit enables the distribution management device to cause the distribution of the first data to the at least one target address related to one or more second distribution units covering the target area.

2. The method according to claim 1, wherein the at least one target address comprises respective addresses of the one or more second distribution units covering the target area, and the method further comprises:
    sending next data to the respective addresses of one or more second distribution units covering the target area for distributing the next data in the target area.

3. The method according to claim 2, wherein the first information further comprises respective coverage areas and geographical locations of the one or more second distribution units, and the method further comprises storing the addresses, the coverage areas and geographical locations of the one or more second distribution units.

4. The method according to claim 1, wherein the at least one target address comprises a first multicast address, the method further comprises:
    sending next data to the first multicast group identified by the first multicast address for distributing the next data in the target area.

5. The method according to claim 1, wherein the first information further comprises a first indication of distribution approach, the at least one target address comprises a second multicast address, and the method further comprises:
    based on the first indication of distribution approach,
        sending next data to the second multicast group identified by the second multicast address and the address of the first distribution unit for distributing the next data in the target area.

6. The method according to claim 1, wherein the first information about one or more third distribution units is stored in the first distribution unit, the method further comprises:
- determining whether an area covered by the one or more third distribution units is able to cover the target area or not;
- performing the step of sending the message, when the determine the area covered by one or more third distribution units is not able to cover the target areas; and
- sending the first data and next data to one or more of the one or more third distribution units whose coverage area is covering the target area, when the determine the area covered by one or more third distribution units is able to cover the target areas.

7. The method according to claim 1, further comprising:
- receiving a third multicast address, or a second indication of distribution approach associated to an address of a fourth distribution unit and a fourth multicast address from the distribution management device;
- joining a third multicast group identified by the third multicast address, or a fourth multicast group identified by the fourth multicast address and the address of the fourth distribution unit based on the second indication of distribution approach; and
- receiving data from the third multicast group, or the fourth multicast group,
- wherein the first distribution unit is a destination of data to be distributed by the third multicast group identified by the third multicast address, and wherein the fourth distribution unit is a source of another data to be distributed and the first distribution unit is a destination of the another data to be distributed, and the fourth multicast address and the second indication of distribution approach are same for each distribution unit of the fourth multicast group.

8. An apparatus comprising at least one processor; and at least one memory including computer program code, wherein the at least one memory and the computer program code are configured to, with the at least one processor, cause the apparatus at least:
- send a message to a distribution management device, the message comprising an indication of a target area related to first data to be distributed;
- receive, from the distribution management device, first information comprising at least one target address related to one or more second distribution units covering the target area, the first information received in response to the sending of the message; and
- when the message does not include the first data, send the first data to the at least one target address, wherein when the message does include the first data, the apparatus enables the distribution management device to cause the distribution of the first data to the at least one target address related to one or more second distribution units covering the target area.

9. The apparatus according to claim 8, wherein the at least one target address comprises respective addresses of the one or more second distribution units covering the target area, the apparatus is further caused to at least:
- send next data to the respective addresses of one or more second distribution units covering the target area for distributing the next data in the target area.

10. The apparatus according to claim 9, wherein the first information further comprises respective coverage areas and geographical locations of the one or more second distribution units, and the apparatus is further caused to at least store the addresses, the coverage areas and geographical locations of the one or more second distribution units.

11. The apparatus according to claim 8, wherein the at least one target address comprises a first multicast address, the apparatus is further caused to at least:
- send next data to the first multicast group identified by the first multicast address for distributing the next data in the target area.

12. The apparatus according to claim 8, wherein the first information further comprises a first indication of distribution approach, the at least one target address comprises a second multicast address, and the apparatus is further caused to at least: based on the first indication of distribution approach,
- send next data to the second multicast group identified by the second multicast address and the address of the apparatus for distributing the next data in the target area.

13. The apparatus according to claim 8, wherein the first information about one or more third distribution units is stored in the apparatus, the apparatus is further caused to at least:
- determine whether an area covered by the one or more third distribution units is able to cover the target area or not;
- send the message, when determine the area covered by the one or more third distribution units is not able to cover the target area; and
- send the first data and next data to one or more of the one or more third distribution units whose coverage area is covering the target area, when determine the area covered by the one or more third distribution units is able to cover the target area.

14. The apparatus according to claim 8, wherein apparatus is further caused to at least:
- receive a third multicast address, or a second indication of distribution approach associated with an address of a fourth distribution unit and a fourth multicast address from the distribution management device;
- join a third multicast group identified by the third multicast address, or a fourth multicast group identified by the fourth multicast address and the address of the fourth distribution unit based on the second indication of distribution approach; and
- receive data from the third multicast group, or the fourth multicast group,
- wherein the apparatus is a destination of data to be distributed by the third multicast group identified by the third multicast address, and wherein the fourth distribution unit is a source of another data to be distributed and apparatus is a destination of the another data to be distributed, and the fourth multicast address and the second indication of distribution approach are same for each distribution unit of the fourth multicast group.

15. An apparatus comprising at least one processor; and at least one memory including computer program code, wherein the at least one memory and the computer program code are configured to, with the at least one processor, cause apparatus is further caused to at least:
- receive a message, including an indication of a target area related to first data to be distributed from a first distribution unit;
- determine one or more second distribution units covering the target area;
- send first information comprising at least one target address from a distribution management device to the first distribution unit, wherein the at least one target address is related to the one or more second distribution units covering the target area; and when the message includes the first data, send, the first data to the at least one target address, wherein when the message does not include the first data, the apparatus enables the first distribution unit to cause the distribution of the first data to the at least one target address related to one or more second distribution units covering the target area.

16. The apparatus according to claim 15, wherein the at least one target address comprises respective addresses of the one or more second distribution units covering the target area.

17. The apparatus according to claim 16, wherein the first information further comprises respective coverage areas and geographical locations of the one or more second distribution units.

18. The apparatus according to claim 15, wherein the first information further comprises a first indication of distribution approach, the at least one target address comprises a second multicast address, and the apparatus is further caused to at least:

send an address of the first distribution unit to the one or more second distribution units; and send the first information to the one or more second distribution units.

19. The apparatus according to claim 15, wherein the apparatus is further caused to at least:

send a third multicast address, or a second indication of distribution approach associated with an address of a fourth distribution unit and a fourth multicast address to the first distribution unit, wherein the first distribution unit is a destination of data to be distributed by a third multicast group identified by the third multicast address, and wherein the fourth distribution unit is a source of another data to be distributed and the first distribution unit is a destination of another data to be distributed, and the fourth multicast address and the second indication of distribution approach are same for each distribution unit of the fourth multicast group.

* * * * *